(12) United States Patent
Czaplicki et al.

(10) Patent No.: US 7,473,715 B2
(45) Date of Patent: Jan. 6, 2009

(54) TWO COMPONENT (EPOXY/AMINE) STRUCTURAL FOAM-IN-PLACE MATERIAL

(75) Inventors: Michael J. Czaplicki, Rochester, MI (US); David J. Kosal, Richmond, MI (US); Kevin Hicks, Harrison Township, MI (US)

(73) Assignee: Zephyros, Inc., Romeo, MI (US)

( * ) Notice: Subject to any disclaimer, the term of this patent is extended or adjusted under 35 U.S.C. 154(b) by 235 days.

(21) Appl. No.: 10/985,197

(22) Filed: Nov. 10, 2004

(65) Prior Publication Data

US 2005/0119372 A1 Jun. 2, 2005

Related U.S. Application Data

(63) Continuation-in-part of application No. 10/916,103, filed on Aug. 11, 2004, now abandoned, which is a continuation of application No. 09/847,252, filed on May 2, 2001, now Pat. No. 6,787,579.

(51) Int. Cl.
C08J 9/08 (2006.01)
C08J 9/32 (2006.01)
B01J 13/02 (2006.01)

(52) U.S. Cl. ............................. 521/54; 521/76; 521/83; 521/100; 521/135; 521/178

(58) Field of Classification Search ................. 525/178, 525/135, 54; 521/178, 135, 54, 76, 83, 100
See application file for complete search history.

(56) References Cited

U.S. PATENT DOCUMENTS

| | | | |
|---|---|---|---|
| 4,427,481 A | 1/1984 | Smith et al. | |
| 4,538,380 A | 9/1985 | Colliander | |
| 4,601,769 A | 7/1986 | DeHoff | |
| 4,693,775 A | 9/1987 | Harrison et al. | |
| 4,724,243 A | 2/1988 | Harrison | |
| 4,749,434 A | 6/1988 | Harrison | |
| 4,769,166 A | 9/1988 | Harrison | |
| 4,778,845 A | 10/1988 | Tschan et al. | |
| 4,871,590 A | 10/1989 | Merz et al. | |
| 4,898,630 A | 2/1990 | Kitoh et al. | |
| 4,908,273 A | 3/1990 | Urech et al. | |
| 4,922,596 A | 5/1990 | Wycech | |
| 4,923,902 A | 5/1990 | Wycech | |
| 4,978,562 A | 12/1990 | Wycech | |
| 4,995,545 A | 2/1991 | Wycech | |
| 5,124,186 A | 6/1992 | Wycech | |
| 5,157,076 A * | 10/1992 | Greenlee et al. | 525/83 |
| 5,266,133 A | 11/1993 | Hanley et al. | |
| 5,342,873 A | 8/1994 | Merz et al. | |
| 5,382,606 A | 1/1995 | Butikofer | |
| 5,470,886 A | 11/1995 | Makhlouf et al. | |
| 5,475,039 A | 12/1995 | Butikofer | |
| 5,648,401 A | 7/1997 | Czaplicki | |
| 5,712,317 A | 1/1998 | Makhlouf et al. | |
| 5,783,272 A | 7/1998 | Wong | |
| 5,884,960 A | 3/1999 | Wycech | |
| 5,894,071 A | 4/1999 | Merz et al. | |
| 5,932,680 A | 8/1999 | Heider | |
| 5,948,508 A | 9/1999 | Pastore et al. | |
| 5,964,979 A | 10/1999 | George et al. | |
| 5,985,435 A | 11/1999 | Czaplicki et al. | |
| 5,994,422 A | 11/1999 | Born et al. | |
| 6,004,425 A | 12/1999 | Born et al. | |
| 6,030,701 A | 2/2000 | Johnson et al. | |
| 6,040,350 A | 3/2000 | Fukui | |
| 6,057,382 A | 5/2000 | Karim et al. | |
| 6,077,884 A | 6/2000 | Hess et al. | |
| 6,096,791 A | 8/2000 | Born et al. | |
| 6,103,784 A | 8/2000 | Hilborn et al. | |
| 6,133,335 A | 10/2000 | Mahoney et al. | |
| 6,136,398 A | 10/2000 | Willett et al. | |
| 6,136,944 A | 10/2000 | Stewart et al. | |
| 6,153,302 A | 11/2000 | Karim et al. | |
| 6,162,504 A | 12/2000 | Hubert et al. | |
| 6,174,932 B1 | 1/2001 | Pachl et al. | |
| 6,218,442 B1 | 4/2001 | Hilborn et al. | |
| 6,228,449 B1 | 5/2001 | Meyer | |

(Continued)

FOREIGN PATENT DOCUMENTS

DE 199 19 783 A1 11/2000

(Continued)

OTHER PUBLICATIONS

Sartomer M-cure reactive Modifier for amine cured epoxy resins, Stratomer Sep. 2004.*

(Continued)

*Primary Examiner*—Irina S Zemel
(74) *Attorney, Agent, or Firm*—Dobrusin & Thennisch PC

(57) ABSTRACT

The present invention relates to methods, materials, and products for forming a foamed product, comprising the steps of combining an epoxy-based component with an amine-based component. The epoxy component is cross-linked through a polymerization reaction catalyzed by the amine formulation. In this regard, an reactive mixture or exothermic reaction is created between the epoxy component and the amine component when combined. The heat generated by the exothermic reaction softens a thermoplastic shell of a blowing agent formulated within the epoxy component thereby enabling a solvent core within the thermoplastic shell of the blowing agent to expand from the heat generated by the exothermic or reactive mixture.

23 Claims, No Drawings

U.S. PATENT DOCUMENTS

| | | |
|---|---|---|
| 6,232,433 B1 | 5/2001 | Narayan |
| 6,235,842 B1 | 5/2001 | Kuwano et al. |
| 6,263,635 B1 | 7/2001 | Czaplicki |
| 6,277,898 B1 | 8/2001 | Pachl et al. |
| 6,287,669 B1 | 9/2001 | George et al. |
| 6,303,672 B1 | 10/2001 | Papalos et al. |
| 6,312,668 B2 | 11/2001 | Mitra et al. |
| 6,319,964 B1 | 11/2001 | Blank et al. |
| 6,348,513 B1 | 2/2002 | Hilborn et al. |
| 6,350,791 B1 | 2/2002 | Feichtmeier et al. |
| 6,376,564 B1 | 4/2002 | Harrison |
| 6,403,222 B1 | 6/2002 | Harrison |
| 6,419,305 B1 | 7/2002 | Larsen |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,476 B1 | 9/2002 | Imai et al. |
| 6,467,834 B1 | 10/2002 | Barz et al. |
| 6,471,285 B1 | 10/2002 | Czaplicki et al. |
| 6,479,560 B2 | 11/2002 | Freitag et al. |
| 6,482,486 B1 | 11/2002 | Czaplicki et al. |
| 6,486,256 B1 | 11/2002 | Tarbutton et al. |
| 6,506,494 B2 | 1/2003 | Brandys et al. |
| 6,548,593 B2 | 4/2003 | Merz et al. |
| 6,561,571 B1 | 5/2003 | Brennecke |
| 6,607,831 B2 | 8/2003 | Ho et al. |
| 6,620,501 B1 | 9/2003 | Kassa et al. |
| 6,634,698 B2 | 10/2003 | Kleino |
| 6,668,457 B1 | 12/2003 | Czaplicki |
| 6,682,818 B2 | 1/2004 | Czaplicki et al. |
| 6,706,772 B2 | 3/2004 | Czaplicki et al. |
| 6,730,713 B2 | 5/2004 | Czaplicki |
| 6,740,379 B1 | 5/2004 | Congard |
| 6,740,399 B1 | 5/2004 | George et al. |
| 6,753,379 B1 | 6/2004 | Kawate et al. |
| 6,774,171 B2 | 8/2004 | Kassa |
| 6,777,079 B2 | 8/2004 | Zhou et al. |
| 6,787,065 B1 | 9/2004 | Schapira et al. |
| 6,787,579 B2 | 9/2004 | Czaplicki et al. |
| 6,787,593 B2 | 9/2004 | Bell et al. |
| 6,787,605 B2 | 9/2004 | Clough et al. |
| 6,787,606 B1 | 9/2004 | Chen |
| 6,790,597 B2 | 9/2004 | Dershem et al. |
| 6,790,906 B2 | 9/2004 | Chaignon et al. |
| 6,797,371 B1 | 9/2004 | Gehlsen et al. |
| 6,800,157 B2 | 10/2004 | Tarbutton et al. |
| 6,800,680 B2 | 10/2004 | Stark et al. |
| 6,805,768 B2 | 10/2004 | Agarwal et al. |
| 6,806,320 B2 | 10/2004 | Everaerts et al. |
| 6,811,864 B2 | 11/2004 | Czaplicki et al. |
| 6,890,964 B2 | 5/2005 | Czaplicki et al. |
| 6,911,109 B2 | 6/2005 | Giroux et al. |
| 7,119,149 B2 | 10/2006 | Ferguson et al. |
| 2002/0009582 A1 | 1/2002 | Golden |
| 2002/0120064 A1 | 8/2002 | Khandpur et al. |
| 2002/0123575 A1 | 9/2002 | Kato et al. |
| 2002/0136891 A1 | 9/2002 | Khandpur et al. |
| 2002/0137808 A1 | 9/2002 | Gehlsen et al. |
| 2002/0187305 A1* | 12/2002 | Czaplicki et al. ............ 428/143 |
| 2003/0050352 A1 | 3/2003 | Guenther et al. |
| 2003/0060522 A1 | 3/2003 | Czaplicki et al. |
| 2003/0060523 A1 | 3/2003 | Czaplicki |
| 2003/0069335 A1 | 4/2003 | Czaplicki et al. |
| 2003/0105175 A1* | 6/2003 | Czaplicki et al. .............. 521/54 |
| 2003/0119987 A1* | 6/2003 | Eadara et al. ................ 525/107 |
| 2003/0186049 A1 | 10/2003 | Czaplicki et al. |
| 2004/0033324 A1 | 2/2004 | Meyer |
| 2004/0048060 A1 | 3/2004 | Kassa |
| 2004/0048078 A1 | 3/2004 | Czaplicki et al. |
| 2004/0063800 A1 | 4/2004 | Brantl et al. |
| 2004/0079478 A1 | 4/2004 | Merz |
| 2004/0131840 A1 | 7/2004 | Ferguson et al. |
| 2004/0180193 A1 | 9/2004 | Oda et al. |
| 2004/0181013 A1 | 9/2004 | Schenkel |
| 2004/0197545 A1 | 10/2004 | Gehlsen et al. |
| 2004/0202881 A1 | 10/2004 | Everaerts et al. |
| 2004/0221953 A1 | 11/2004 | Czaplicki et al. |
| 2004/0229000 A1 | 11/2004 | Khandpur et al. |
| 2004/0234774 A1 | 11/2004 | Cheng et al. |
| 2005/0016677 A1 | 1/2005 | Carlson et al. |
| 2005/0020703 A1 | 1/2005 | Czaplicki et al. |
| 2005/0119372 A1 | 6/2005 | Czaplicki et al. |
| 2006/0155045 A1 | 7/2006 | Tsuno et al. |

FOREIGN PATENT DOCUMENTS

| | | |
|---|---|---|
| EP | 0 360 214 A2 | 3/1990 |
| EP | 0 442 178 A1 | 8/1991 |
| EP | 0 819 723 A1 | 1/1998 |
| EP | 1 022 320 A1 | 7/2000 |
| EP | 1 055 699 A1 | 11/2000 |
| EP | 0 703 931 B1 | 10/2003 |
| EP | 1 240 266 B1 | 2/2004 |
| EP | 0 851 894 B1 | 4/2004 |
| EP | 1 272 587 B1 | 5/2004 |
| EP | 1 155 084 B1 | 6/2004 |
| EP | 1 431 325 A1 | 6/2004 |
| EP | 1 075 498 B1 | 7/2004 |
| EP | 0 820 491 B1 | 8/2004 |
| EP | 0 947 529 B1 | 8/2004 |
| EP | 1 185 595 B1 | 8/2004 |
| EP | 1 252 217 B1 | 8/2004 |
| EP | 1 449 868 A1 | 8/2004 |
| EP | 1 023 413 B1 | 9/2004 |
| EP | 1 155 082 B1 | 9/2004 |
| EP | 1 305 376 B1 | 9/2004 |
| EP | 1 155 053 B1 | 10/2004 |
| EP | 1 163 308 B1 | 10/2004 |
| EP | 1 471 105 A2 | 10/2004 |
| EP | 1 001 893 B1 | 11/2004 |
| EP | 1 115 770 B1 | 11/2004 |
| EP | 1 187 888 B1 | 11/2004 |
| JP | 56-004432 | 1/1981 |
| JP | 57-117542 | 7/1982 |
| JP | 04059819 | 2/1992 |
| JP | 4059820 | 2/1992 |
| JP | 9249730 A | 9/1997 |
| WO | WO 95/33785 | 12/1995 |
| WO | WO 97/02967 | 1/1997 |
| WO | WO 97/12929 | 4/1997 |
| WO | WO 97/19124 | 5/1997 |
| WO | WO 98/52997 | 11/1998 |
| WO | WO 99/02578 | 1/1999 |
| WO | WO 00/12571 | 3/2000 |
| WO | WO 00/12595 | 3/2000 |
| WO | WO 00/13876 | 3/2000 |
| WO | WO 00/20483 | 4/2000 |
| WO | WO 00/37242 | 6/2000 |
| WO | WO 00/37554 | 6/2000 |
| WO | WO 00/39232 | 7/2000 |
| WO | WO 00/40629 | 7/2000 |
| WO | WO 00/52086 | 9/2000 |
| WO | WO 01/57130 | 8/2001 |
| WO | WO 01/88033 | 11/2001 |
| WO | WO 02/070620 A1 | 9/2002 |

| | | |
|---|---|---|
| WO | WO 02/088214 A1 | 11/2002 |
| WO | WO 03/011954 A1 | 2/2003 |
| WO | WO 03/040251 A1 | 5/2003 |
| WO | WO 03/054069 A1 | 7/2003 |
| WO | WO 03/059997 A1 | 7/2003 |
| WO | WO 2004/050740 A1 | 6/2004 |
| WO | WO 2004/055092 A1 | 7/2004 |
| WO | WO 2004/060956 A1 | 7/2004 |
| WO | WO 2004/060984 A1 | 7/2004 |
| WO | WO 2004/062869 A2 | 7/2004 |
| WO | WO 2004/065485 A1 | 8/2004 |
| WO | WO 2004/076507 A2 | 9/2004 |
| WO | WO 2004/085510 A1 | 10/2004 |
| WO | WO 2004/085564 A1 | 10/2004 |
| WO | WO 2004/099312 A1 | 11/2004 |

OTHER PUBLICATIONS

Londa et al, The Effect of Epoxy Hardeners and Accelerators in a Two Part Epoxy Primer Containing Garamite 1958 Additive, ChemBrief, Jul. 2004, vol. 4, Issue 1.

Recent Work by SCP Scientists Leads to the Discovery of a Revolutionary Class of Thixotropes, ChemBrief, Jul. 2001, vol. 1, Issue 3.

Mixed Mineral Thixotropes, Southern Clay Products, Inc. A Rockwood Specialties, Inc. Company, Dec. 2002.

"The Epoxy Book", A System Three Resins Publication, pp. 1-41, System Three Resins, Inc., Seattle, Washington, 2000.

"Epoxy Resins", Second Edition Encyclopedia of Polymer Science and Engineering, vol. 6, pp. 322-382, 1985.

Excerpt from http://www.uniroyalchemical.com/tips/tip 0699 1.htm, Jan. 2001.

Excerpt from http://www.iprod.auc.dk/forsk/poly/student/ballon.htm, Jan. 2001.

Excerpt from http://www.fibreglast.com/FillerPage.htm, Dec. 2000.

PCT International Search Report For International Application No. PCT/US02/03133 dated Oct. 23, 2002.

Written Opinion dated Mar. 11, 2003.

Born, Peter and Bernd Mayer, "Structural Bonding in Automotive Applications", AutoTechnology, Apr. 2004, pp. 44-47.

Dvorko. "One-Part Epoxy Compounds and Derived Foam Plastics", 2004.

* cited by examiner

TWO COMPONENT (EPOXY/AMINE) STRUCTURAL FOAM-IN-PLACE MATERIAL

CLAIM OF BENEFIT OF FILING DATE

This application is a continuation-in-part of U.S. application Ser. No. 10/916,103 filed on Aug. 11, 2004, which is a continuation of Ser. No. 09/847,252 filed on May 2, 2001, now U.S. Pat. No. 6,787,579, both of which are incorporated herein by reference for all purposes. This application claims the benefit of the filing dates of both prior applications.

FIELD OF THE INVENTION

The present invention relates generally to foam-in-place structural materials used for reinforcement of structural members. More particularly, the present invention relates to a two-component epoxy/amine foamed resin exhibiting improved mechanical properties (higher compressive strength, compressive modulus, and glass transition temperature) as well as enhanced shear-thinning characteristics and better-cured ductility.

BACKGROUND OF THE INVENTION

Traditional foam-in-place structural materials known in the art generally disclose polyurethane materials and epoxy-based materials. These materials incorporate a method to create volumetric expansion and a curing agent as well effectuate curing at room temperature and achieve a degree of control of expansion and cure rate characteristics. Although these prior art materials are both useful and successful in a number of applications, certain structural reinforcement applications in the automotive industry, for example, would benefit from a material having improved mechanical properties, such as a higher compressive strength, little change in modulus over a broad temperature range and a glass transition temperature that exceeds 200° F. In addition, improved cured ductility that would then enable the material to deform plastically would provide definite benefit. Further, these structural reinforcement applications in many applications, including automotive, may also benefit from a shear-thinning structural material which exhibits an increased viscosity at a zero shear rate and a decreased viscosity at a higher shear rates prior to curing. This enables the material to move as a fluid while being dispensed but then have minimal fluid following dispensing. This shear thinning behavior can also assist with the development of a uniform, consistent foamed cell structure by allowing more effective foaming gas entrapment.

As known by those skilled in the art, a number of factors determine the suitability of a process for forming a foamed product of the type in which a blowing agent forms cells in a synthetic resin as the resin is cured. Most significantly, the interaction of the rate of cure and the rate at which the blowing gas is generated must be matched to create the proper cured product. If the resin cures too rapidly there is inadequate time for the gas to form the proper size and number of gas voids in the finished product. Over expansion of the forming foam product must also be avoided. Rapid expansion due to a slow cure rate relative to gas evolution may cause the expanding foam to simply collapse as a result of inadequate wall strength surrounding the individual gas cells.

A number of prior art techniques are available to control the rate of foam expansion and the cure rate. For example, a wide-range of reactivities are available in commercial resins and curing agents. In addition, resins are available in a range of viscosities, which is another parameter, which can be used to control foam expansion rate. That is, it is known that a low viscosity resin can generally be expanded to a greater volume with a given volume of gas than a higher viscosity material; however, the resin must have sufficient viscosity to contain the gas at the pressures at which it is generated in order for the foam to be properly formed.

With respect to automotive applications, foamed products must have good environmental resistance and, most significantly, in many applications they must protect metal from corrosion while maintaining adhesion to the substrate. In the past many foamed parts were made using polyurethane, which provides a number of desirable attributes. It is known, however, that alternatives to urethane-based foams or more precisely materials based on the reactivate of the isocyanate chemical functional group are frequently more environmentally desirable, in part due to the potential for unreacted functional groups in the finished products and difficulty in handling isocyanate functional chemicals in manufacturing processes. In addition, the polyurethane materials found in the prior art fail to provide optimum mechanical properties, generally possessing lower elastic modulus strength and lower glass transition temperature than what is capable with epoxy-based materials. In comparison with polyurethane materials, however, the epoxy-based materials found in the prior art often exhibit both poor cured ductility and higher viscosity during dispensing.

Accordingly, there is a need in industry and manufacturing operations for a structural material, which exhibits improved mechanical properties, such as higher compressive strength, compressive modulus, glass transition temperature, better-cured ductility, combinations thereof or the like. The improved mechanical properties allow the structural material of the present invention to plastically deform without significant reduction in modulus or glass transition temperature as compared with typical epoxy-based materials. In addition, there is a need for an improved material, which can be used in a variety of applications wherein one or both components utilize a thixotropic filler, which produces pronounced shear-thinning characteristics. By providing a material with excellent cured physical properties and desirable processing attributes, the present invention addresses and overcomes the shortcomings found in the prior art.

SUMMARY OF THE INVENTION

The present invention relates to methods, materials, and products for foam-in-place structural reinforcement of hollow structures such as automobile cavities. In one embodiment, the present invention comprises a two-component foam-in-place structural material for producing a foamed product. Though other resin systems are possible, the first component of the system includes an epoxy-based resin. Preferably, the first component is formulated with a physical blowing agent, and more preferably one having a shell or skin that will change state to provide volumetric increase to create expansion. For example, the shell is a thermoplastic that, upon heating, will melt or soften to enable a solvent core to expand the shell. The second component includes an amine, and may be formulated with an agent for allowing the resulting material to exhibit ductility but such agent may result in a reduction in a modulus, glass transition temperature, or both. It is contemplated that the amine of the present invention could be a primary, secondary, or tertiary amine. Generally speaking, the amine is an epoxy curing agent or modifier, and preferably, a high solids epoxy curing agent, though it could be a water-borne epoxy-curing agent. Other examples of an amine suitable for use in the present invention include polyamides, aliphatic amines, and cycloaliphatic amines as well as other agents that can function as accelerators or catalysts. A thixotropic filler optionally is included in either or both of the first or second components, and possibly as a stand-alone component. In one embodiment, this additive preferably increases viscosity at a near zero shear rate and decreases viscosity at a higher shear rate, more commonly known in the art as shear-thinning.

The present invention provides a method of forming a foamed product, which comprises the steps of combining the first component (with a blowing agent) with the second component (with a curing agent). The first component, preferably an epoxy, is cross-linked through a polymerization reaction with the second component of the formulation (e.g. an amine). In this regard, an exothermic reaction or reactive mixture is created between the epoxy component and the amine component when combined. The heat generated by the exothermic reaction softens the thermoplastic shell of the blowing agent formulated within the epoxy component thereby enables the solvent core within the thermoplastic shell to expand the thermoplastic shell and thereby create expansion. In a preferred embodiment the mixture of materials is in liquid form. However, it is contemplated that the mixture of materials could also comprise a paste or solids of varying viscosities and textures.

DETAILED DESCRIPTION OF THE PREFERRED EMBODIMENTS OF THE INVENTION

As used herein, all concentrations shall be expressed as percentages by weight unless otherwise specified.

In a highly preferred embodiment, the method and composition of the present invention has two main components: (1) epoxy resin formulated with a physical blowing agent having a thermoplastic shell with a solvent core; and (2) an amine curing agent which when cured produces a material capable of plastically deforming, having improved ductility or both. In addition, a thixotropic additive is formulated in one or both the first and second components, which produces shear-thinning characteristics useful for processing and generation of a foamed product. Moreover, the exothermic reaction generated by the combination of the two main components serves to soften the physical blowing agent, which consists of a thermoplastic shell with a solvent core. As the thermoplastic shell softens, the solvent expands the shell to create a foaming process. The preferred solvent and shell is selected for its expansion properties when exposed to the heat of the exothermic reaction, which occurs during polymerization. However, by using the preferred fillers, and less reactive amine functional materials such as GVI 4040 excessive exotherm, which would otherwise be produced by the curing reaction (and which could produce charring) is eliminated and therefore prevents charring is prevented.

In a particularly preferred embodiment, the components or formulation comprising the present invention include the following:

Epoxy

The epoxy component typically includes an epoxy resin, which may be composed of one type of resin or multiple different epoxy resins. Epoxy resin is used herein to mean any of the conventional dimeric, oligomeric or polymeric epoxy materials containing at least one epoxy functional group. The epoxy resins may be epoxy containing materials having one or more oxirane rings polymerizable by a ring opening reaction.

The epoxy resin may be aliphatic, cycloaliphatic, aromatic, combinations thereof or the like. The epoxy may be supplied as a solid (e.g., as pellets, chunks, pieces or the like) or a liquid. The epoxy may include an ethylene copolymer or terpolymer that may possess an alpha-olefin. One exemplary epoxy resin may be a phenolic resin, which may be a novalac type or other type resin. Other preferred epoxy resins may include a bisphenol F epoxy resin, bisphenol-A epichlorohydrin ether polymer, or a bisphenol-A epoxy resin which may be modified with butadiene or another polymeric additive.

Examples of preferred epoxy resins, which may be used separately or in combination include: a bisphenol A epoxy resin sold under the tradename DER 331, which is commercially available from Dow Chemical, Midland, Mich.; an isopropyl epoxy resin (e.g., Isopropylidenebisphenol bis[2-glycidyl-3-n-butoxy)1 propyl ether) sold under the tradename ARALDITE PY 4122, which is commercially available from Vantinco; and a polyglycol diglycidyl ether sold under the tradename ERISYS GE-23, which is commercially available from CVC Specialty Chemicals. Advantageously, the epoxy can often be chosen to assist in providing a material having improved ductility.

The preferred epoxy resin has a number average molecular weight of from about 350 to about 600 and, on average, each molecule of epoxy has from about 1.8 to about 2.5 epoxide functional groups. The preferred epoxy resin has a viscosity of from about 5,000 to 100,000 cps (Brookfield viscosity) at 70° F. and a specific gravity of from about 1.0 to about 1.4. As stated, the preferred form of the resin is a liquid. Other epoxy resins, which may be suitable in the present invention in a particular application include DER 317, DER 337 and DER 324. A resin forms from about 35 to about 95% by weight and more preferably from about 50 to about 75% by weight of the composition of the present invention.

It is contemplated that the epoxy or resin component or the amine component of the present invention may be formulated with a physical blowing agent and, more particularly, a blowing agent having a thermoplastic shell with a solvent core. An example of a preferred blowing agent, which according to the present invention is formulated with the resin component, is sold under the trade name Expancel 820-DU. Most preferably, the solvent core of the blowing agent of the present invention is a liquid.

Amine

The second or amine component of the present invention may be formulated with a curing agent, which enables the material to achieve modulus or glass transition temperature compared to materials found in the prior art but is still capable of significant plastic deformation. In addition, the preferred amine component facilitates a structural material having improved mechanical properties such as higher compressive strain to failure. The presence of the enhanced mechanical properties is particularly useful in structural reinforcement applications found in the automotive industry but whose utility is not limited to such applications. A particularly preferred amine is sold by Air Products under the trade name ANCAMINE 2556.

In one preferred embodiment, the amine component includes a mixture of a piperazine amine and an amidoamine. An example of a preferred piperazine amine is a aminoethyl piperazine that is mixed with a nonylphenol and is sold under the tradename ANCAMINE 1786, which is commercially available from Air Products. An example of a preferred amidoamine (e.g., a polyamide or polyamidoamine) is sold under the tradename ANCAMIDE 2137, which is also commercially available from Air Products. Advantageously, the amine can often be chosen to assist in providing a material having improved ductility.

Additive(s)

A preferred additive or filler component in the present invention is one, which will cause both components to be shear thinning to enhance processing attributes of the material. Although a number of suitable fillers are known in the art and discussed in commonly-assigned U.S. Pat. No. 5,648,401, incorporated by reference, a particular preferred additive of the present invention is a thixotropic additive formulated within either or potentially both of the first and second components which causes both components to be shear-thinning. An example of such a thixotropic filler is an aramid pulp and is sold under the trade name Kevlar 1F543. In a particularly preferred embodiment, the thixoptropic filler is formulated in at least one, and potentially both the first or epoxy component and the second or amine component. This additive effectuates shear thinning or an increased viscosity at a zero shear rate and a decreased viscosity at a higher shear rate.

In one preferred embodiment, one or both of the epoxy component and the amine component include one or more clays prior to or after mixing of the epoxy component with the amine component. A preferred clay is an ammonium clay which can include minerals (e.g., smectite or sepiolite) salts, chlorides (e.g., ammonium chlorides) or combinations thereof. One particularly preferred clay is an alkyl quarternary ammonium clay that includes smectite group mineral, sepiolite, dimethyl ammonium chloride and eimethyl benzyl ammonium chloride and which is sold under the tradename GARAMITE 1958 and is commercially available from Southern Clay Products. Typically the epoxy component will include between about 2% and about 14% by weight clay while the amine component will include between about 5% and about 25% by weight clay prior to mixing. In one preferred embodiment, the clay has at least one nanoscale dimension. For example, the clay may be in the form of platelets having a nanoscale thickness.

When used, clays or other thixotropic fillers may be mixed with amine component or the epoxy component according to a particularly preferred protocol. For example, in one embodiment, the clay is mixed at a high shear rate with part or the entirety of one or both of the epoxy component and the amine component preferably prior to combination of the epoxy component with the amine component. For instance, the clay may be mixed with an impeller into one or more epoxy resins or into an amine at a impeller rate of at least about 1500 ft/min, more typically at least 2000 ft/min and even more typically at least 2500 ft/min for a time period of at least 4 minutes, more typically at least 7 minutes and even more typically at least 9 minutes. The impeller rate is typically calculated into feet per minute by multiplying impeller diameter, Pi and the revolutions per minute of the impeller or impeller shaft, which is typically between about 2500 and 3500 rpm. Advantageously, such mixing can exfoliate a portion of the clay. Moreover, such mixing can assist the ultimate epoxy/amine admixture in exhibiting desirable properties, which are further discussed below.

A number of other additives can be utilized in the present invention such as carbon black, solid rubber particles, hollow microspheres, cement and inert polymer particles, if desired in a particular application. In this regard, the preferred formulation set forth below may utilize additional components such as an optional coloring agent, reinforcements and fillers.

One preferred additive is a property (e.g., strength, durability, impact or the like) modifier, which can imbue the foamed article or composition with desired properties such as adhesivity, hardness, durability, strength and/or resistance to impacts, chemicals, heat, weather, abrasion or a combination thereof. In one embodiment, a relatively fast curing acrylate or acrylate monomer is employed as a strength or durability modifier. As an example, a preferred modifier is an aliphatic acrylate modifier (e.g., an aliphatic acrylic ester), which is sold under the tradename M-CURE 400 and is commercially available from Sartomer Company, Inc., Exton, Pa. The modifier may be added to the amine component, the epoxy component or the admixture thereof. In one preferred embodiment the modifier is admixed into the epoxy component in an amount between at least about 1% and about 15% by weight of the epoxy component. It is also contemplated that the modifier can act as a cure accelerator and, thus, may speed up the cure rate, the exotherm or both.

Other desirable property (e.g., impact) modifiers include acrylic modifiers, which can include polyacrylates including ($C_4$-$C_{12}$) acrylate homo or copolymers, second stage graft copolymerized with methyl methacrylate and styrene; poly (ethylhexyl acrylate-co-butyl-acrylate) graft copolymerized with styrene, and/or acrylonitrile and/or methyl methacrylate; polybutyl acrylate graft polymerized with acrylonitrile and styrene, combinations thereof or the like. One particularly preferred modifier is a butyl acrylate/methyl methacrylate sold under the tradname PARALOID KM 334 and commercially available from Rohm and Haas.

The following table I sets forth preferred ranges in percent by weight for the components of one embodiment of the composition of the present invention:

| First Component (Epoxy) | (weight %) | Second Component (Amine) | (weight %) |
|---|---|---|---|
| DER 331 | 97.943 | Ancamine 2556 | 60.714 |
| Kevlar 1F543 | 0.748 | GVI 4040 | 12.500 |
| Expancel 820-DU | 0.935 | Kevlar 1F543 | 1.786 |
| Phtalo Green | 0.374 | Polyfil 90 | 12.500 |
| | | Nanomer I.30.E | 12.500 |

Table II below also illustrates a preferred formulation of the present invention:

| First Component (Epoxy) | (weight %) | Second Component (Amine) | (weight %) |
|---|---|---|---|
| Reaction Product of Epicholorohydrin & Bisphenol A | 60.98 | Aminoethyl) Piperazine 1-(2, (AEP)) (50%) & Nonylphenol (50%) | 68.57 |
| Isopropylidenebisphenol bis[(2-glycidyloxy-3-n-butoxy)1 propyl ether] | 16.26 | Polyamide | 17.14 |

-continued

| First Component (Epoxy) | (weight %) | Second Component (Amine) | (weight %) |
|---|---|---|---|
| Aliphatic Acrylic Ester | 4.07 | Alkyl Quaternary Ammonium Clay (Smectite group mineral, Sepiolite, Dimethyl ammonium chloride, Eimethyl benzyl ammonium chloride) (8.66%) | 14.29 |
| Polyglycol Diglycidyl Ether | 8.13 | | |
| Alkyl Quaternary Ammonium Clay (Smectite group mineral, Sepiolite, Dimethyl ammonium chloride, Eimethyl benzyl ammonium chloride) (8.66%) | 6.30 | | |
| p(BA/MMA) | 2.03 | | |
| Copolymer (>80%), Blowing Agent (Isobutane) (10-15%) & Residual Monomer-Acrylonitrile (<0.01%) | 2.03 | | |
| Organic Pigment Red 48:2 | 0.2 | | |

Table III below also illustrates a preferred formulation of the present invention:

| First Component (Epoxy) | (weight %) | Second Component (Amine) | (weight %) |
|---|---|---|---|
| Reaction Product of Epicholorohydrin & Bisphenol A | 58.48 | Aminoethyl) Piperazine 1-(2, (AEP)) (50%) & Nonylphenol (50%) | 78.95 |
| Bisphenol F Epoxy Resin | 19.49 | Ceramic Microspheres | 6.58 |
| Aliphatic Acrylic Ester | 7.8 | Alkyl Quaternary Ammonium Clay (Smectite group mineral, Sepiolite, Dimethyl ammonium chloride, Eimethyl benzyl ammonium chloride) (8.66%) | 14.47 |
| Alkyl Quaternary Ammonium Clay (Smectite group mineral, Sepiolite, Dimethyl ammonium chloride, Eimethyl benzyl ammonium chloride) (8.66%) | 6.63 | | |
| Portland Cement | 2.34 | | |
| Copolymer (>80%), Blowing Agent (Isobutane) (10-15%) & Residual Monomer-Acrylonitrile (<0.01%) | 5.07 | | |
| Organic Pigment Red 48:2 | 0.19 | | |

It should be understood that the amounts listed in tables I, II and III are meant to be exemplary and can vary by ±0.5 weight percentage points, ±2 weight percentage points, ±10 weight percentage points, ±20 weight percentage points or more. It should be further understood that the amounts listed in tables I, II and III are meant to be exemplary and can vary by ±0.5%, ±2%, ±10%, ±20% of their listed values or more.

In the method of the present invention, the first or resin component and the second or amine component are combined, preferably in liquid form. For example, the materials can be mixed either statically or dynamically with the mixture then being placed in a mold cavity of chosen shape and dimension, the mold cavity can be an automotive body cavity or any cavity that could be structurally reinforced by the foam-in-place structural material. In an alternative embodiment or methodology, atomized streams of the separate components or materials can be impinged into a mold cavity. The thixotropic filler and the resin are preferably premixed. Once mixed, the composition cures at room temperature (that is, without adding external heat).

Advantageously, upon application of the components to form the composition or material, the composition or material can often exhibit a relatively high degree of self support. For example, depending upon the particular formulation, it may be possible to apply the composition to a vertical or substantially vertical surface and exhibit relatively little flow due to gravitational forces. It may also be possible, upon application and again depending upon the particular formulation, for the composition to be placed upon a horizontal surface and exhibit relatively little horizontal flow. Thus, it may be possible to employ one or more of the compositions of the present invention without the use of additional support members. It is also contemplated that these self supporting compositions may be pumpable.

Also advantageous, the composition can cure in a relatively short period of time. For example, compositions such as those including an ester (e.g., the aliphatic acrylic ester) can exhibit at least 90%, 95% 98% complete cure or more in less than about 15 minutes, more typically less than about 11 minutes and even more typically less than about 8 minutes. It has also been found that even shorter cure times can be achieved by exposing the composition to electromagnetic waves and particularly microwaves. For example, such compositions can exhibit at least 90%, 95% 98% complete cure or more in less than about 7 minutes, more typically less than about 4 minutes and even more typically less than about 1.5 minutes. As such, it is contemplated that a dispensing device or other separate device may be fitted with a wave source for exposing the composition to such electromagnetic waves and particularly microwaves.

Once cured, certain embodiments of the present invention can exhibit particularly desirable properties. For example, the composition can form a foam having a relatively uniform cell structure. Moreover, many of the foams according to the present invention can exhibit relatively high compressive module. For instance, foams according to the present invention, after expansions of greater than 50% of their original size, can exhibit a compressive modulus of greater than about 300 MPa, more typically greater than about 700 MPa and even more typically greater than about 950 MPa at a temperature between about 10° C. and about 35° C. As a further example, foams according to the present invention, after expansions of greater than 175% of their original size, can exhibit a compressive modulus of greater than about 100 MPa, more typically greater than about 400 MPa, still more typically greater than about 500 MPa even more typically greater than about 600 MPa at a temperature between about 10° C. and about 35° C. It is even possible according to certain embodiments of the present invention to form a foam that exhibits at least 200% expansion and a compressive modulus of 600 MPa. In addition, while glass transition temperatures can vary for foams according to the present invention depending upon the ingredients employed, glass transition temperatures greater than about 70° C. have been achieved. Lastly, it has been found that compositions of the present invention formed upon the combination of the amine component with the epoxy component can exhibit relatively good self supporting properties as the composition foam and/or cure.

Thus, it is apparent that there has been provided in accordance with the invention a method and apparatus that fully satisfy the objects, aims and advantages set forth above. While the invention has been described in connection with specific embodiments thereof it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. A method for producing a foamed article, comprising the steps of:
    providing an epoxy component, said epoxy component including an epoxy resin, a blowing agent having a thermoplastic shell filled with a solvent core;
    providing an amine component, said amine component including at least one amine; and
    combining said epoxy component and said amine component to form a reactive mixture and allowing said thermoplastic shell filled with a solvent core to soften from amine-epoxy exotherm and then expand due to gas pressure from said solvent core, wherein said reactive mixture cures upon combining said epoxy component with said amine component through a cross-linking of said epoxy resin;
    wherein one or both of the epoxy component and the amine component include an ammonium clay; and
    wherein the ammonium clay is between about 2% and about 14% by weight of the epoxy component, between 5% and about 25% by weight of the amine component or both.

2. A method as in claim 1, wherein the epoxy resin comprises from about 35% to about 95% of the epoxy component.

3. A method as in claim 1, wherein the epoxy resin and the ammonium clay are combined prior to adding the blowing agent when forming the epoxy component.

4. A method as in claim 1, wherein the ammonium clay includes at least one of smectite, sepiolite or a chloride.

5. A method as in claim 1, wherein the reactive admixture expands greater than 50% of its original unexpanded state to form the foamed article and the foamed article has a compressive modulus greater than about 700 MPa.

6. A method as in claim 1, wherein the reactive mixture includes a aliphatic acrylic ester.

7. A method as in claim 1, wherein the reactive mixture includes a butyl acrylatel methyl methacrylate.

8. A method as in claim 1, wherein the reactive mixture includes an additive selected from glass microspheres or ceramic microspheres.

9. A method for producing a foamed article, comprising the steps of:
    providing an epoxy component, said epoxy component including:
    i) an epoxy resin that includes at least one of a bisphenol A epoxy resin, an isopropyl epoxy resin and a polyglycol diglycidyl ether;
    ii) a blowing agent having a thermoplastic shell filled with a solvent core;
    iii) a butyl acrylate/methyl methacrylate modifier;
    iv) an acrylic ester; and
    v) an ammonium clay providing an amine component, said amine formulation including:
    i) at least one amine selected from a piperazine amine and an amidoamine; and
    ii) an ammonium clay;
    combining said epoxy component and said amine component to form a reactive mixture and allowing said thermoplastic shell filled with a solvent core to soften from amine-epoxy exotherm and then expand due to gas pressure from said solvent core:
    wherein the ammonium clay is between about 2% and about 14% by weight of the epoxy component and between 5% and about 25% by weight of the amine component.

10. A method as in claim 9, wherein the epoxy resin comprises from about 35% to about 95% of the epoxy component.

11. A method as in claim 9, wherein the epoxy resin and the ammonium clay are combined prior to adding the blowing agent when forming the epoxy component.

12. A method as in claim 9, wherein the ammonium clay includes at least one of smectite, sepiolite or a chloride.

13. A method as in claim 9, wherein the foamed article exhibit the reactive admixture expands greater than 50% of its original unexpanded state to form the foamed article and the foamed article has a compressive modulus greater than about 700 MPa.

14. A method as in claim 9, wherein the reactive mixture includes an additive selected from glass microspheres or ceramic microspheres.

15. A method for producing a foamed article, comprising the steps of:
- providing an epoxy component, said epoxy component including:
  - i) an epoxy resin that includes a combination of a bisphenol A epoxy resin, an isopropyl epoxy resin and a polyglycol diglycidyl ether;
  - ii) a blowing agent having a thermoplastic shell tilled with a solvent core;
  - iii) a butyl acrylate/methyl methacrylate modifier;
  - iv) a acrylic ester; and
  - v) an alkyl quaternary ammonium clay that includes smectite, sepiolite and an ammonium chloride; providing an amine component, said amine formulation including:
  - i) at least one amine selected from a piperazine amine and an amidoamine; and
  - ii) an alkyl quaternary ammonium clay that includes smectite, sepiolite and an ammonium chloride;
- combining said epoxy component and said amine component to form a reactive mixture and allowing said thermoplastic shell filled with a solvent core to soften from amine-epoxy exotherm and then expand due to gas pressure from said solvent core:
- wherein the ammonium clay is between about 2% and about 14% by weight of the epoxy component and between 5% and about 25% by weight of the amine component.

16. A method as in claim 15, wherein the epoxy resin comprises from about 35% to about 95% of the epoxy component.

17. A method as in claim 15, wherein the epoxy resin and the ammonium clay are combined prior to adding the blowing agent when forming the epoxy component.

18. A method as in claim 15, wherein the reactive admixture expands greater than 50% of its original unexpanded state to form the foamed article and the foamed article has a compressive modulus greater than about 700 MPa.

19. A method as in claim 15, wherein the reactive mixture includes an additive selected from glass microspheres or ceramic microspheres.

20. A method as in claim 1, wherein said reactive mixture is formed and said thermoplastic shell filled with said solvent core is allowed to soften from said amine-epoxy exotherm and then expand due to gas pressure from said solvent core, all without adding external heat at room temperature.

21. A method as in claim 20, wherein said epoxy resin has a molecular weight from about 350 to about 600.

22. A method as in claim 21, wherein the amount of ammonium clay comprises from about 2% to about 15% of said epoxy component and the reactive mixture is applied to a structure of an automotive vehicle.

23. A method as in claim 21, wherein the amount of ammonium clay comprises from about 5% to about 25% of said amine component and the reactive mixture is applied to a structure of an automotive vehicle.

* * * * *